Dec. 25, 1962 L. R. CHAPMAN, JR 3,070,331
NAVIGATION SYSTEM
Filed March 18, 1955 2 Sheets-Sheet 1

INVENTOR.
LESLIE R. CHAPMAN, jr
BY H. A. Mackey
ATTORNEY.

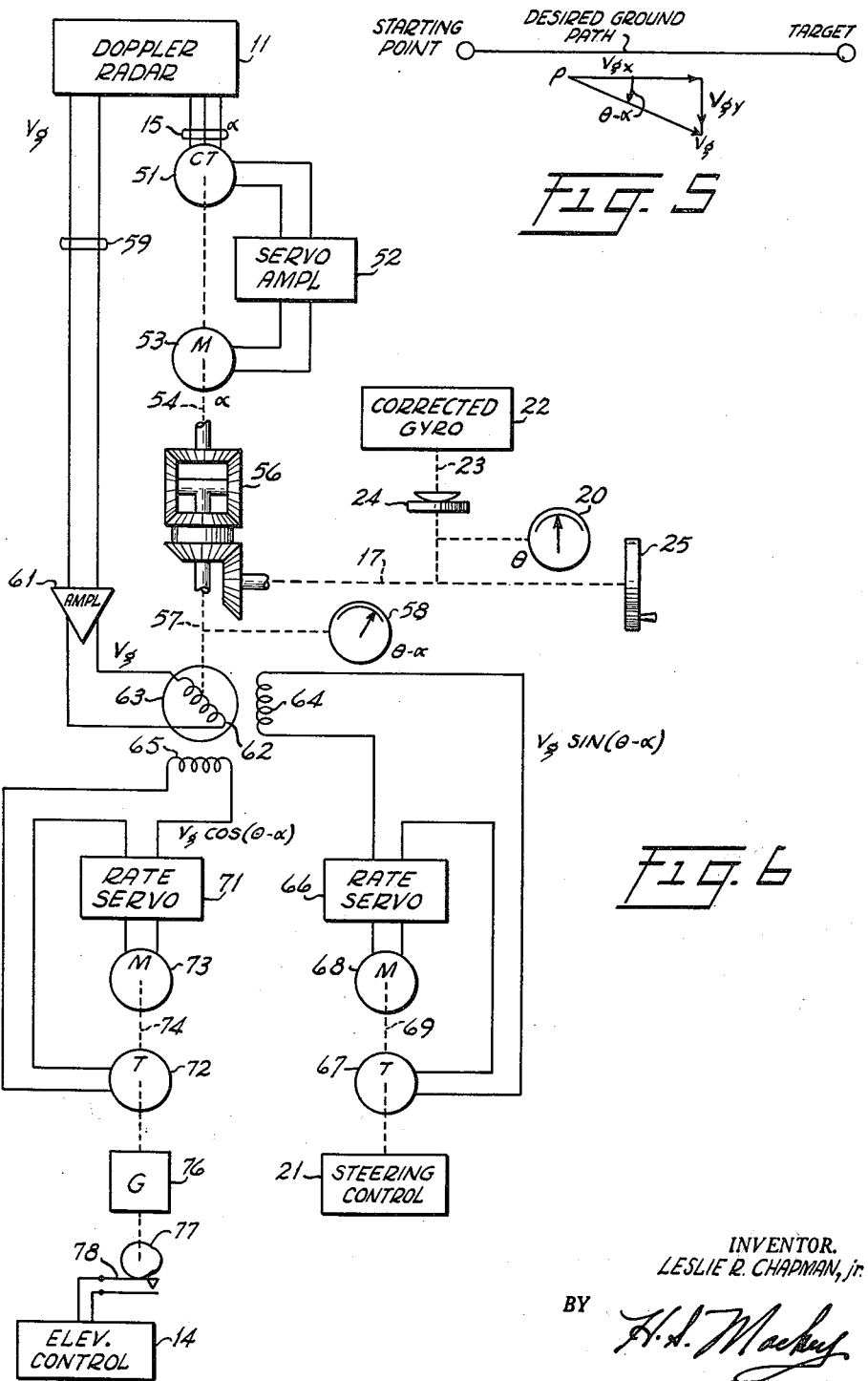

United States Patent Office 3,070,331
Patented Dec. 25, 1962

3,070,331
NAVIGATION SYSTEM
Leslie R. Chapman, Jr., Thornwood, N.Y., assignor to General Precision, Inc., a corporation of Delaware
Filed Mar. 18, 1955, Ser. No. 495,081
12 Claims. (Cl. 244—77)

This invention relates to a navigation system and particularly to an airborne navigation system for guiding an unmanned aircraft along a predetermined path for a predetermined distance.

The art of aerial navigation by means of airborne apparatus entirely independent of ground based stations has received considerable attention in recent years. Various approaches to the problem have been proposed but at the present time, systems employing Doppler radar techniques are the most highly developed. In a typical Doppler radar navigation system, two beams of microwave energy, making a fixed angle with respect to each other in the horizontal plane, but rotatable together about a vertical axis, are directed from the aircraft toward the earth at equal vertical angles. The reflected energy received from each beam will be shifted in frequency from the transmitted energy due to the relative motion between the aircraft and the earth. If the beams make unequal angles (in the horizontal plane) with the ground track of the aircraft, the two received frequencies will be shifted unequally. The difference in the received frequencies is used as an error signal to rotate the beams about a vertical axis until the two received frequencies are equal. Then the bisector of the angle between the beams represents the ground track of the aircraft and the angle between this bisector and the longitudinal axis of the aircraft is the drift angle, $\alpha$. The frequency shift is proportional to ground speed, $V_g$.

Many navigation systems have been built around Doppler radar systems to enable an aircraft to be guided to any point on the surface of the earth. These systems are usually complex, involving gyroscopic and magnetic elements to obtain an accurate heading reference, computers for calculating the great circle course between any two points, corrections for the ellipticity of the earth, and many other refinements. Such systems are obviously too complex to be suited for use in a pilotless craft which makes but one flight. Considering the other extreme, a missile containing no navigational equipment whatsoever could be launched with the proper initial course but the probability of its striking a preselected target decreases rapidly with distance.

It is an object of this invention to provide a completely airborne navigation system suitable for use in a pilotless craft.

Another object of the invention is to provide apparatus for guiding an aircraft over a predetermined ground path.

Another object of the invention is to provide apparatus for guiding an aircraft along a predetermined course for a predetermined distance.

Another object of the invention is to provide a completely airborne navigation system for guiding an aircraft over a predetermined ground path without requiring the determination on the craft of either true or magnetic north.

The invention comprises apparatus, such as a Doppler radar system, for measuring continuously the ground speed and the drift angle of the craft. Also included is a gyroscope for measuring continuously the angle between the desired course and the axis of the craft. In one embodiment, the difference between the latter angle and the drift angle is used as an error signal to steer the craft. Ground speed is integrated to obtain distance travelled, and after a preselected distance has been traversed, a signal is generated to cut off the propulsion mechanism or to steer the craft downward, or both.

For a clearer understanding of the invention, reference may be made to the accompanying drawing in which:

FIGURE 5 is a diagram useful in explaining a modification of the invention; and

FIGURE 6 is a block diagram of a modified form of the invention.

Figure 1:
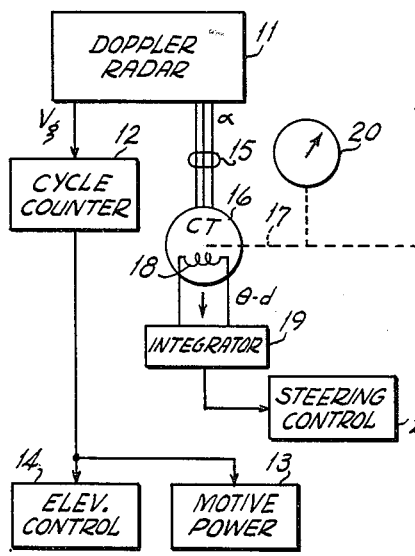
FIGURE 1 is a block diagram of one embodiment of the invention.

Referring now to FIG. 1, there is shown a Doppler radar system 11. The details of this system are not a part of the present invention and it may take many forms, it only being required that the system determine continuously the horizontal component of ground speed $V_g$ and the drift angle $\alpha$ of the aircraft. The system may, for example, be similar to that described in the copending application of Tull and Gillette, Serial No. 749,184, filed May 20, 1947, for Navigation System, now Patent No. 2,869,118 granted January 13, 1959, or to that described in the copending application of Berger and Tull, Serial No. 49,926, filed September 18, 1948 for Course and Speed Indicating System, now Patent No. 2,869,117 granted January 13, 1959. The Doppler radar system 11 illustrated in FIG. 1 delivers ground speed as an alternating voltage the frequency of which is proportional to ground speed and delivers the drift angle, $\alpha$, as three-wire information obtained from a synchro transmitter. The frequency of the ground speed signal is proportional to ground speed and therefore the total accumulated number of cycles is proportional to the distance travelled. The ground speed signal is therefore led to a cycle counter 12 which is arranged to generate a signal after a predetermined number of cycles have been received. The output of the cycle counter 12 may control either the motive power unit 13 of the aircraft or the elevation control surfaces 14 or both.

The three-wire information indicative of the drift angle, $\alpha$, is led by conductors 15 to the stator of a synchro control transformer 16 the rotor winding 18 of which has a voltage induced therein when the angle $\alpha$ is different from the angular position of the rotor winding 18, and its shaft 17. This induced voltage constitutes a steering error signal and is passed to an integrator 19, about which more will be said later, and thence to the steering control mechanism 21.

The aircraft is also equipped with a gyroscope 22 which maintains its spin axis, represented by the shaft 23, at a fixed angular position. The shafts 17 and 23 are connected together by means of a slip clutch 24 so that the angular positions between the two shafts may be adjusted. A handwheel 25 is connected to the shaft 17 so that this adjustment may be made. If desired the slip clutch may be replaced by a mechanical differential, but at present the slip clutch is preferred because of its simplicity. An indicator 20 is provided to display the angular position of shaft 17 with respect to the longitudinal axis of the aircraft.

Figure 2:
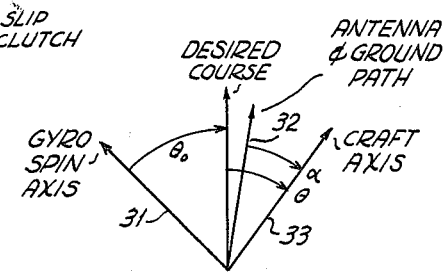
FIGURE 2 is a diagram useful in explaining the invention.

In operation, the gyroscope 22 is started while the aircraft is on the ground and its spin axis may be in any direction such as that represented by the line 31 of FIG. 2. The angle $\theta_0$ between the spin axis of the gyroscope and the desired course of the aircraft cannot, of course, be controlled accurately, but its value is not important. The angle $\theta$ between the desired course and the craft axis can, however, be determined accurately by ground instruments, and the handwheel 25 is adjusted until the position of the shaft 17, as shown by the indicator 20, is precisely equal to this angle $\theta$, which angular position will thereafter be maintained by the gyroscope 22.

The drift angle $\alpha$ is the angle between the axis of the antenna, represented by the line 32 in FIG. 2, and the longitudinal axis of the aircraft, represented by the line 33. During flight the Doppler radar system 11 operates to maintain the axis of the antenna precisely along the ground path of the aircraft in the manner previously described briefly in this specification and as fully described in the aforementioned copending applications. It can be seen from FIG. 2 that if the aircraft is on the desired course, the angles $\theta$ and $\alpha$ will be equal. It is apparent from FIG. 1 that since the stator windings of the control transformer 16 are excited in accordance with the angle $\alpha$ and since the rotor is positioned in accordance with the angle $\theta$, the rotor winding 18 will have no voltage induced in it when the angles $\theta$ and $\alpha$ are equal. If these angles differ by less than four degrees, the voltage induced in winding 18 will be very nearly proportional to $\theta-\alpha$. This voltage is used as an error signal and, after integration by the integrator 19, controls the steering apparatus 21 so as to maintain $\theta-\alpha$ equal to zero. Before the craft is launched, the cycle counter 12 should be adjusted to generate an output signal after a predetermined number of cycles have been counted so that the motive power of the craft may be cut off, or the elevators depressed, or both, so as to bring the craft to the earth at the desired distance from the starting point.

The procedure for setting up the apparatus may be summarized as follows. The gyroscope 22 is started; the angle $\theta$ is measured and set into the shaft 17 by means of the hand wheel 25; the cycle counter 12 is adjusted in accordance with the desired distance and then the aircraft is launched. The Doppler radar system 11 and the gyroscope 22 together will keep the aircraft on its course and the cycle counter 12 will return the craft to the earth at the desired distance from its starting point.

It would be possible to dispense with the integrator 19 of FIG. 1 and operate the steering control mechanism 21 directly from the output of rotor winding 18. However, this procedure would have the disadvantage that if the aircraft left the desired ground path for any reason, for example, due to wind, the craft would only be returned to the desired course which would be parallel to but laterally displaced from the desired ground path. It is therefore preferred that some apparatus be employed to integrate the error signal.

Figure 3:
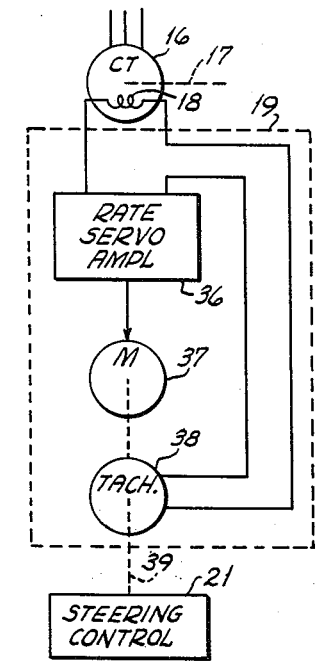
FIGURES 3 and 4 illustrate various forms which the integrator of FIG. 1 may take.

Referring now to FIG. 3, one form of integrator is shown within the dotted lines 19. The error signal from the winding 18 operates through a rate servo amplifier 36, a motor 37 and a tachometer generator 38 to rotate a shaft 39 at a speed proportional to the error signal. The tachometer generator 38 is a generator whose frequency is constant and whose amplitude is proportional to its speed of rotation. As shown in FIG. 3, the input to the amplifier 36 is the difference between the voltage of winding 18 and the voltage of the generator 38 so that the speed of the shaft 39 is proportional to the voltage from winding 18 and the position of shaft 39 represents the accumulated value of $\theta-\alpha$ which, in turn, is very nearly equal to the accumulated deviation of the craft from the desired ground path. The shaft 39 adjusts the steering control mechanism 21 to return the aircraft to the desired ground path.

Figure 4:
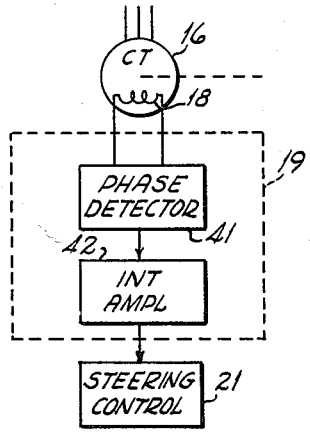

Referring now to FIG. 4, there is shown another form of integrator which may be used. The voltage of the winding 18 which is an alternating voltage of reversible phase is converted to a direct voltage of reversible polarity by means of a phase detector 41. The output of the phase detector 41 is passed through an integrating amplifier 42 which may, for example, comprise a direct coupled "Miller Feedback" amplifier. The output of the amplifier 42 is therefore a direct voltage indicative of the accumulated deviation of the aircraft from the desired ground path and may be used to adjust the steering control mechanism 21.

Referring now to FIG. 5, there is shown the starting point and the target together with the desired ground path connecting them. Let it be assumed that the aircraft has deviated from the desired ground path and is now at some arbitrary point P.

Let it also be assumed that the ground speed vector is making some arbitrary angle $\theta-\alpha$ with the desired ground path. The ground speed vector can be resolved into two components $V_{gx}$ and $V_{gy}$ parallel and perpendicular respectively to the desired ground path. It can be seen that, in order to return the craft to the desired ground path and to keep it there, $\int V_{gy} dt$ must be zero. This is a more accurate steering error signal than $\int (\theta-\alpha) dt$ used in the apparatus so far described, since for accuracy the apparatus of FIGS. 1 and 4 requires that $(\theta-\alpha)$ be always small and that the ground speed be constant. It can also be seen that the ground distance from the starting point to the target is $\int V_{gx} dt$ rather than $\int V_g dt$ used in the embodiment of FIGS. 1 to 4. The errors introduced are small but may be eliminated by a slight modification of the apparatus.

Referring now to FIG. 6, there is shown the same Doppler radar system 11. The three-wire output indicative of the drift angle $\alpha$ is led by conductors 15 to a control transformer 51 which cooperates with a servo amplifier 52 and a motor 53 to position the shaft 54 in accordance with the angle $\alpha$. The gyroscope 22 is connected as before so that the shaft 17 is positioned in accordance with the angle $\theta$. A mechanical differential 56 subtracts $\alpha$ from $\theta$ delivering its output to a shaft 57 which output is visually displayed on an indicator 58.

Doppler radar systems such as the system 11 are usually provided with several ground speed outputs one of which is in the form of an alternating voltage of constant frequency the magnitude of which is proportional to ground speed and this form of output is used in the embodiment of FIG. 6. If such an output is not available, it may be secured by conventional apparatus from the voltage the frequency of which is proportional to ground speed. The ground speed voltage is led by conductors 59 to a booster amplifier 61 which is provided to prevent loading of the radar system 11. The output of the amplifier 61 energizes the rotor winding of an inductive resolver 63 the rotor of which is positioned by the shaft 57. The voltages induced in stator windings 64 and 65 will therefore be proportional to $V_g \sin(\theta-\alpha)$ and $V_g \cos(\theta-\alpha)$ respectively.

The voltage of winding 64 is led to a rate servo amplifier 66 which cooperates with a tachometer generator 67 and a motor 68 to rotate a shaft 69 at a speed proportional to $V_g \sin(\theta-\alpha)$. The angular position of the shaft 69 is therefore indicative of $\int V_g \sin(\theta-\alpha) dt$, and is used to adjust the steering control mechanism 21.

The voltage of winding 65 is led to a rate servo amplifier 71 which cooperates with a tachometer generator 72 and a motor 73 to rotate the shaft 74 at a speed proportional to $V_g \cos(\theta-\alpha)$. The angular position of the shaft 74 will therefore be proportional to $\int V_g \cos(\theta-\alpha) dt$ and may be employed to operate the elevation control mechanism 14 when the desired distance has been traversed. In FIG. 6, this mechanism has been indicated schematically as comprising a gear box 76 and a cam 77 which operates a switch 78 to control the mechanism 14.

The apparatus of FIG. 6 is more accurate than that of FIGS. 1–4 because of the use of the more accurate steering error and distance travelled signals, as previously explained. Greater flexibility is provided by the use of the mechanical differential 56 to subtract $\alpha$ from $\theta$, permitting greater instantaneous values of $\theta-\alpha$ without introducing errors.

It can be seen that each of the navigation systems described above secures the high accuracy obtainable with Doppler radar techniques without requiring airborne apparatus for determining true or magnetic north or for computing the desired course. The course is determined by ground based instruments and the airborne gyroscope "remembers" this course and provides continuously a measure of the difference between the desired course and the axis of the aircraft.

The apparatus described is merely illustrative and it will be understood that many modifications may be made within the scope of the invention.

What is claimed is:

1. Apparatus for guiding an aircraft over a predetermined ground path for a predetermined distance comprising, means for determining continuously the magnitude and sense of a first angle equal to the angle between a reference direction on the frame of said aircraft and its ground path, means for determining continuously the magnitude and sense of a second angle equal to the angle between the desired course and said reference direction, means for determining continuously the ground speed of said aircraft, means for generating signals indicative of functions of said ground speed and of the algebraic difference between said first and second angles, and means responsive to said signals for steering said aircraft in the horizontal and vertical planes.

2. Apparatus for guiding an aircraft over a predetermined ground path for a predetermined distance comprising, Doppler radar means for determining continuously a first angle equal to the angle between the longitudinal axis of said aircraft and its ground path and for deriving continuously a first signal indicative of the ground speed of said aircraft, gyroscopic means for maintaining constant the angular position of a first shaft, means for mechanically joining a second shaft to said first shaft in any selected angular relationship whereby the position of said second shaft may represent a second angle equal to the angle between the desired course and said longitudinal axis, means for deriving a second signal indicative of the algebraic difference between said first and second angles, and means responsive to said first and second signals for steering said aircraft in the horizontal and vertical planes.

3. Apparatus for guiding an aircraft over a predetermined ground path comprising, means for determining continuously the magnitude and sense of a first angle equal to the angle between a reference direction on the frame of said aircraft and its ground path, means for determining continuously the magnitude and sense of a second angle equal to the angle between the desired course and said reference direction, means for generating a signal indicative of the time integral of the algebraic difference between said first and second angles, and means responsive to said signal for steering said aircraft.

4. Apparatus for guiding an aircraft over a predetermined ground path comprising, means for determining continuously a first angle equal to the angle between the longitudinal axis of said aircraft and its ground path, gyroscopic means for maintaining constant the angular position of a first shaft, means mechanically joining a second shaft to said first shaft in any selected angular relationship whereby the position of said second shaft may represent a second angle equal to the angle between the desired course and said longitudinal axis, means for deriving a first signal indicative of the algebraic difference between said first and second angles, means for deriving an error signal indicative of the time integral of said first signal, and means responsive to said error signal for steering said aircraft.

5. Apparatus for guiding an aircraft over a predetermined ground path comprising Doppler radar means for determining continuously a first angle equal to the angle between a reference direction on said aircraft and its ground path, gyroscopic means for maintaining constant the angular position of a first shaft, means for mechanically joining a second shaft to said first shaft in any selected angular relationship whereby the position of said second shaft may represent a second angle equal to the angle between the desired course and said reference direction, means for obtaining an error signal indicative of the algebraic difference between said first and second angles, means for integrating said error signal and means responsive to the integral for steering said aircraft.

6. Apparatus for guiding an aircraft over a predetermined ground path for a predetermined distance comprising, means for determining continuously a first angle equal to the angle between a reference direction of said aircraft and its ground path, means for determining continuously a second angle equal to the angle between the desired course and said reference direction, means for determining continuously the ground speed of said aircraft, means for integrating the ground speed to determine the distance travelled, means for generating an error signal indicative of the algebraic difference between said first and second angles, means responsive to said error signal for steering said aircraft and means responsive to a predetermined distance travelled for decreasing the elevation of said aircraft.

7. Apparatus for guiding an aircraft over a predetermined ground path for a predetermined distance comprising, Doppler radar means for determining continuously a first angle equal to the angle between a reference direction on said aircraft and its ground path and for deriving continuously a signal indicative of the ground speed of said aircraft, means for determining continuously a second angle equal to the angle between the desired course and said reference direction, means for obtaining an indication of the algebraic difference between said first and second angles, means responsive to said indication for steering said aircraft in a horizontal plane, means responsive to said derived signal for determining continuously the distance travelled by said aircraft and means responsive to a predetermined distance travelled for decreasing the elevation of said aircraft.

8. Apparatus for guiding an aircraft over a predetermined ground path for a predetermined distance comprising, Doppler radar means for determining continuously a first angle equal to the angle between the longitudinal axis of said aircraft and its ground path and for deriving continuously a voltage the frequency of which is proportional to the ground speed of said aircraft, gyroscopic means for determining continuously a second angle equal to the angle between the desired course and said axis, synchro means for obtaining an error signal indicative of the algebraic difference between said first and second angles, means for integrating said error signal, means responsive to the integral for steering said aircraft in a horizontal plane, means for counting a predetermined number of cycles of said voltage the frequency of which represents ground speed, and means responsive to the counting of said predetermined number of cycles for decreasing the elevation of said aircraft.

9. Apparatus for guiding an aircraft over a predetermined ground path for a predetermined distance comprising, Doppler radar means for determining continuously a first angle equal to the angle between the longitudinal axis of said aircraft and its ground path and for deriving continuously a voltage the frequency of which is proportional to the ground speed of said aircraft, gyroscopic means for maintaining constant the angular position of a first shaft, means for mechanically joining a second shaft to said first shaft in any selected angular relationship whereby the position of said second shaft may represent a second angle equal to the angle between the desired course and said axis, synchro means for obtaining an error signal indicative of the algebraic difference between said first and second angles, means for integrating said error signal, means responsive to the integral for steering said aircraft in a horizontal plane, means for countng a predetermined number of cycles of said voltage the frequency of which represents ground speed, and means responsive to the counting of said predetermined number of cycles for decreasing the elevation of said aircraft.

10. Apparatus for guiding an aircraft over a predetermined ground path for a predetermined distance comprising, means for determining continuously a first angle equal to the angle between a reference direction on said aircraft and its ground path, means for determining continuously a second angle equal to the angle between the desired course and said reference direction, means for deriving continuously a signal indicative of the ground speed of said aircraft, and means jointly responsive to said signal and to the algebraic difference between said first and second angles for steering said aircraft in the horizontal plane and for controlling the elevation of said aircraft.

11. Apparatus for guiding an aircraft over a predetermined ground path for a predetermined distance comprising, Doppler radar means for determining continuously a first angle equal to the angle between a reference direction on said aircraft and its ground path and for deriving continuously a first signal indicative of the ground speed of said aircraft, gyroscopic means for maintaining constant the angular position of a first shaft, means for mechanically joining a second shaft to said first shaft in any selected angular relationship whereby the position of said second shaft may represent a second angle equal to the angle between the desired course and said reference direction, means for continuously deriving a second signal indicative of the algebraic difference between said first and second angles, and means jointly responsive to said first and second signals for controlling said aircraft in azimuth and elevation.

12. Apparatus for guiding an aircraft over a predetermined ground path for a predetermined distance comprising, Doppler radar means for determining continuously a first angle equal to the angle between the longitudinal axis of said aircraft and its ground path and for deriving continuously an alternating voltage the magnitude of which is proportional to the ground speed of said aircraft, gyroscopic means for maintaining constant the angular position of a first shaft, means for mechanically joining a second shaft to said first shaft in any selected angular relationship whereby the position of said second shaft may represent a second angle equal to the angle between the desired course and said axis, means for continuously deriving a representation of a third angle equal to the algebraic difference between said first and second angles, means jointly responsive to said representation of said third angle and to said alternating voltage for deriving a first signal proportional to the product of the ground speed and the sine of said third angle and for deriving a second signal proportional to the product of the ground speed and the cosine of said third angle, means for integrating each of said signals with respect to time, means responsive to the integral of said first signal for steering said aircraft in a horizontal plane, and means responsive to the integral of said second signal for controlling the elevation of said aircraft.

References Cited in the file of this patent

UNITED STATES PATENTS

| | | |
|---|---|---|
| 1,670,641 | Sperry | May 22, 1928 |
| 2,280,117 | Crane et al. | Apr. 21, 1942 |
| 2,372,185 | Wittkuhns | Mar. 27, 1945 |
| 2,419,970 | Roe et al. | May 6, 1947 |
| 2,476,032 | Feldman | July 12, 1949 |
| 2,482,809 | Thompson | Sept. 27, 1949 |
| 2,515,248 | McCoy | July 18, 1950 |
| 2,613,350 | Kellogg | Oct. 7, 1952 |
| 2,718,001 | Greenwood | Sept. 13, 1955 |
| 2,745,614 | Bennett et al. | May 15, 1956 |
| 2,773,382 | Rand | Dec. 11, 1956 |
| 2,821,349 | Sohn | Jan. 28, 1958 |
| 2,869,118 | Tull | Jan. 13, 1959 |
| 2,962,244 | Harrison | Nov. 29, 1960 |

OTHER REFERENCES

An Analysis for Human Flight Control, IRE convention record, 1956, part 8, pp. 69–83.